(12) United States Patent
Choi et al.

(10) Patent No.: US 12,442,951 B2
(45) Date of Patent: Oct. 14, 2025

(54) REGIONAL PRECIPITATION NOWCASTING SYSTEM AND METHOD BASED ON CYCLE-GAN EXTENSION

(71) Applicant: KOREA METEOROLOGICAL ADMINISTRATION, Seoul (KR)

(72) Inventors: Jaeho Choi, Gwangmyeong-si (KR); Yura Kim, Seoul (KR); Kwangho Kim, Anyang-si (KR); Sunghwa Jung, Seoul (KR); Ikhyun Cho, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 0 days.

(21) Appl. No.: 18/030,922

(22) PCT Filed: Jan. 20, 2023

(86) PCT No.: PCT/KR2023/001038
§ 371 (c)(1),
(2) Date: Apr. 7, 2023

(87) PCT Pub. No.: WO2024/111747
PCT Pub. Date: May 30, 2024

(65) Prior Publication Data
US 2024/0369736 A1 Nov. 7, 2024

(30) Foreign Application Priority Data

Nov. 25, 2022 (KR) .................. 10-2022-0160458
Jan. 10, 2023 (KR) .................. 10-2023-0003325

(51) Int. Cl.
*G06K 9/00* (2022.01)
*G01W 1/10* (2006.01)
(Continued)

(52) U.S. Cl.
CPC ............... *G01W 1/10* (2013.01); *G06T 11/00* (2013.01); *G06V 10/7715* (2022.01);
(Continued)

(58) Field of Classification Search
CPC ..... G01W 1/10; G01W 2203/00; G01W 1/14; G06T 11/00; G06T 2207/20081;
(Continued)

(56) References Cited

U.S. PATENT DOCUMENTS 11,561,326 B1 * 1/2023 Green .................. G06N 3/0475
2022/0003895 A1 1/2022 Choi et al.
(Continued)

FOREIGN PATENT DOCUMENTS

CN 111860975 A 10/2020
CN 115267786 A 11/2022
(Continued)

OTHER PUBLICATIONS

Park, Sunghyun, et al. "Hurricane nowcasting with irregular time-step using neural-ode and video prediction." ICLR 2020 Workshop. https://www.climatechange.ai/papers/iclr2020/21. 2020 (Year: 2020).*
(Continued)

*Primary Examiner* — Atiba O Fitzpatrick
(74) *Attorney, Agent, or Firm* — Bridgeway IP Law Group, PLLC; Sang Ho Lee; Hyun Woo Shin

(57) ABSTRACT

A regional precipitation nowcasting system based on cycle-generative adversarial network (GAN) extension includes an input unit configured to receive an input composite hybrid surface rainfall (HSR) image including precipitation information of a region of interest corresponding to a first time, a cycle-GAN configured to generate a resultant composite HSR image including precipitation information of the region of interest corresponding to a second time which comes later than the first time on the basis of the input composite HSR
(Continued)

image using a first cycle-GAN and a second cycle-GAN which is complementary to the first cycle-GAN, and an output unit configured to output the resultant composite HSR image as a nowcasting image of the region of interest. The regional precipitation nowcasting system and method based on cycle-GAN extension can ensure robust temporal causality by applying pixel losses to a cycle-GAN.

16 Claims, 9 Drawing Sheets

(51) Int. Cl.
| | |
|---|---|
| *G06T 11/00* | (2006.01) |
| *G06V 10/77* | (2022.01) |
| *G06V 10/776* | (2022.01) |
| *G06V 10/778* | (2022.01) |
| *G06V 10/82* | (2022.01) |
| *G06V 20/10* | (2022.01) |

(52) U.S. Cl.
CPC ........ *G06V 10/776* (2022.01); *G06V 10/7796* (2022.01); *G06V 10/82* (2022.01); *G06V 20/10* (2022.01); *G01W 2203/00* (2013.01)

(58) Field of Classification Search
CPC . G06T 2207/20084; G06T 9/002; G06T 5/60; G06V 10/7715; G06V 10/776; G06V 10/82; G06V 20/10; G06V 10/70; G06V 10/774–7796; G06V 10/454; G06N 3/094; G06N 3/0475; G06N 3/02–126; G06N 20/00–20; G06K 9/6256; G06K 9/6257; G06K 9/6259; G06F 18/214–2155; G06F 7/023; G06F 40/16; G01N 29/4481

See application file for complete search history.

(56) References Cited

U.S. PATENT DOCUMENTS

| | | | | |
|---|---|---|---|---|
| 2022/0180174 A1* | 6/2022 | Rawat | ...................... | G06N 3/08 |
| 2023/0143145 A1* | 5/2023 | Price | ...................... | G06N 3/045 |
| | | | | 706/21 |
| 2023/0314657 A1* | 10/2023 | Ballard | ................... | G01W 1/10 |
| | | | | 702/3 |
| 2023/0385994 A1* | 11/2023 | Jawahar | ..................... | G06T 5/77 |
| 2024/0378900 A1* | 11/2024 | Sugawara | ............ | G06V 20/588 |

FOREIGN PATENT DOCUMENTS

| | | | | |
|---|---|---|---|---|
| KR | 1020200120985 A | | 10/2020 | |
| KR | 102175179 B1 * | | 11/2020 | ............. G06N 20/00 |
| KR | 10-2021-0028992 A | | 3/2021 | |
| KR | 10-2021-0115832 A | | 9/2021 | |
| KR | 10-2022-0144237 A | | 10/2022 | |
| KR | 10-2457470 B1 | | 10/2022 | |
| KR | 10-2457893 B1 | | 10/2022 | |
| KR | 10-2022-0164198 A | | 12/2022 | |
| KR | 10-2022-0168716 A | | 12/2022 | |

OTHER PUBLICATIONS

Kim, Wonsu et al., "Construction of a Spatio-Temporal Dataset for Deep Learning-Based Precipitation Nowcasting," Journal of Information Science Theory and Practice, Jun. 20, 2022, vol. 10, No. S, pp. 135-142.
Hess, Philipp et al., "Physically constrained generative adversarial networks for improving precipitation fields from Earth system models", arXiv:2209.07568v1, Aug. 25, 2022, p. 1-37.
Francois, Bastien et al., "Adjusting spatial dependence of climate model outputs with cycle-consistent adversarial networks", Climate Dynamics (2021), Jul. 30, 2021, vol. 57, pp. 3323-3353.
Choi, Suyeon et al., "Rad-cGAN v1.0: Radar-based precipitation nowcasting model with conditional generative adversarial networks for multiple dam domains", Geoscientific Model Development, vol. 15, No. 15, pp. 5967-5985, Aug. 1, 2022.
Zhu, Jun-Yan et al., "Upaired image-to-image translation using cycle-consistent adversarial networks", Aug. 24, 2020. DOI: https://doi.org/10.48550/arXiv.1703.10593. Retrieved from the Internet: URL: https://arxiv.org/pdf/1703.10593.

* cited by examiner

FIG. 8

| Method | Metric | +10min | +20min | +30min | +40min | +50min | +60min | +70min | +80min | +90min | +100min | +110min | +120min |
|---|---|---|---|---|---|---|---|---|---|---|---|---|---|
| Present Invention | PSNR | 25.875 | 25.558 | 24.689 | 24.641 | 24.532 | 24.462 | 24.428 | 24.192 | 24.181 | 24.125 | 24.109 | 24.104 |
|  | SSIM | 0.895 | 0.898 | 0.887 | 0.885 | 0.872 | 0.870 | 0.859 | 0.854 | 0.849 | 0.844 | 0.843 | 0.842 |
| MAPLE | PSNR | 26.395 | 25.050 | 24.037 | 23.517 | 23.288 | 23.351 | 23.428 | 23.057 | 23.091 | 23.981 | 23.467 | 23.818 |
|  | SSIM | 0.915 | 0.897 | 0.878 | 0.864 | 0.854 | 0.847 | 0.841 | 0.837 | 0.833 | 0.830 | 0.834 | 0.836 |
| Conv LSTM | PSNR | 22.985 | 22.599 | 21.132 | 20.825 | 20.463 | 20.098 | 20.299 | 20.542 | 19.997 | 20.223 | 20.496 | 19.593 |
|  | SSIM | 0.861 | 0.858 | 0.853 | 0.850 | 0.845 | 0.843 | 0.842 | 0.841 | 0.833 | 0.829 | 0.829 | 0.821 |

REGIONAL PRECIPITATION NOWCASTING SYSTEM AND METHOD BASED ON CYCLE-GAN EXTENSION

TECHNICAL FIELD

The present invention relates to a precipitation nowcasting system and method, and more particularly, to a regional precipitation nowcasting system and method based on cycle-generative adversarial network (GAN) extension.

BACKGROUND ART

Since ancient times, rain has had a strong influence on human life. Accordingly, the prediction of precipitation has always been a concern of the public. As an example, there has been a numerical weather prediction (NWP) model. The NWP model supports good quantitative precipitation predictions over a wide range of time periods. However, because the NWP model develops convective-scale structures in the early stage of prediction, accuracy cannot be secured for the first few hours. Such a limitation is referred to as a spin-up problem. To solve this problem, the importance of nowcasting which focuses on short-term forecasting has increased.

In meteorology, nowcasting is generally a model or forecasting that accurately predicts the weather within about two hours from the present time. In particular, precipitation nowcasting is generally based on weather radar observations. Although there are various quantitative precipitation forecast (QPF) models, perfect precipitation prediction is always a challenge.

Also, conventional precipitation nowcasting covers a wide area, and there is a limit to nowcasting the weather in a local area in which a user is interested.

Therefore, it is not possible to effectively prepare for local torrential rainfalls and the like on the basis of conventional precipitation nowcasting.

Attempts to use artificial intelligence for precipitation nowcasting are increasing. However, a reliable precipitation nowcasting device is required for localized heavy rain in a local area.

There is a need for a system for acquiring real-time weather information of a local area desired by a user for a desired time.

RELATED ART DOCUMENT

Patent Document (Patent Document 0001) Korean Patent Publication No. 10-2457470 (Oct. 18, 2022)

DISCLOSURE

Technical Problem

The present invention is directed to providing a reliable regional precipitation nowcasting system and method by extending a cycle-generative adversarial network (GAN) to a time-series domain.

Objectives of the present invention are not limited to that described above, and other objectives which have not been described will be clearly understood by those of ordinary skill in the art from the following description.

Technical Solution

One aspect of the present invention provides a regional precipitation nowcasting system based on cycle-generative adversarial network (GAN) extension including: an input unit configured to receive an input composite hybrid surface rainfall (HSR) image including precipitation information of a region of interest corresponding to a first time; a cycle-GAN configured to generate a resultant composite HSR image including precipitation information of the region of interest corresponding to a second time which comes later than the first time, on the basis of the input composite HSR image; and an output unit configured to output the resultant composite HSR image as a nowcasting image of the region of interest.

The cycle-GAN may include a first cycle-GAN and a second cycle-GAN which is complementary to the first cycle-GAN, and the first cycle-GAN and the second cycle-GAN may perform forward image mapping which temporally goes forward and backward image mapping which temporally goes backward, respectively.

The first cycle-GAN may include a forward generator configured to learn predictive mapping of a first predictive composite HSR image of the second time on the basis of the input composite HSR image of the first time, a backward generator configured to learn predictive mapping of a first cycle predictive composite HSR image of the first time on the basis of the first predictive composite HSR image of the second time, a forward discriminator configured to evaluate accuracy of predictive mapping of the forward generator and discriminate between the input composite HSR image and the first predictive composite HSR image, and a backward discriminator configured to evaluate accuracy of predictive mapping of the backward generator and discriminate between the first predictive composite HSR image and the first cycle predictive composite HSR image.

The second cycle-GAN may learn predictive mapping of a complementary input composite HSR image corresponding to the input composite HSR image of the first time on the basis of a complementary first predictive composite HSR image obtained by applying a first pixel loss function to the first predictive composite HSR image of the second time using the backward generator, the complementary input composite HSR image obtained by applying a second pixel loss function to the input composite HSR image having a complementary relationship with the input composite HSR image, may learn predictive mapping of a second cycle predictive composite HSR image of the second time on the basis of the complementary input composite HSR image of the first time using the forward generator, may evaluate the accuracy of predictive mapping of the forward generator and discriminate between the complementary input composite HSR image and the second cycle predictive composite HSR image using the forward discriminator, and may evaluate the accuracy of predictive mapping of the backward generator and discriminate between the complementary first predictive composite HSR image and the complementary input composite HSR image using the backward discriminator.

The first cycle-GAN may be trained using a first cycle-consistency loss function so that the first cycle predictive composite HSR image may match the input composite HSR image, the forward discriminator may be trained using a forward adversarial loss function to increase a probability of wrongly determining the first predictive composite HSR image as the input composite HSR image, and the backward discriminator may be trained using a backward adversarial loss function to increase a probability of wrongly determining the first cycle predictive composite HSR image as the first predictive composite HSR image.

The second cycle-GAN may be trained using a second cycle-consistency loss function so that the second cycle predictive composite HSR image may match the complementary first predictive composite HSR image, the forward discriminator may be trained using the forward adversarial loss function to increase a probability of wrongly determining the second cycle predictive composite HSR image as the complementary input composite HSR image, and the backward discriminator may be trained using the backward adversarial loss function to increase a probability of wrongly determining the complementary input composite HSR image as the complementary first predictive composite HSR image.

The cycle-GAN may output, as the resultant composite HSR image, the first predictive composite HSR image, the complementary first predictive composite HSR image, or the second cycle predictive composite HSR image when the first pixel loss function and the second pixel loss function converge on a predetermined reference pixel loss function value and the first cycle-consistency loss function and the second cycle-consistency loss function converge on a predetermined cycle-consistency loss function value.

Each of the forward generator and the backward generator may include an encoder configured to reduce a size of the input composite HSR image and extract a plurality of feature maps from the input composite HSR image, a plurality of squeeze-and-excitation (SE)-residual blocks configured to recalibrate the feature maps, and a decoder configured to restore the size of the input composite HSR image reduced by the encoder.

The forward discriminator and the backward discriminator may use a patch-GAN architecture that makes discriminations in units of patches.

Another aspect of the present invention provides a regional precipitation nowcasting method based on cycle-GAN extension including: an input data receiving operation of receiving an input composite HSR image including precipitation information of a region of interest corresponding to a first time; a cycle-GAN execution operation of generating a resultant composite HSR image including precipitation information of the region of interest corresponding to a second time which comes later than the first time, on the basis of the input composite HSR image; and an output operation of outputting the resultant composite HSR image as a nowcasting image of the region of interest.

The cycle-GAN may include a first cycle-GAN and a second cycle-GAN which is complementary to the first cycle-GAN, and the first cycle-GAN and the second cycle-GAN may perform forward image mapping which temporally goes forward and backward image mapping which temporally goes backward, respectively.

The first cycle-GAN may perform a forward image mapping operation of learning predictive mapping of a first predictive composite HSR image of the second time on the basis of the input composite HSR image of the first time using a forward generator, a backward image mapping operation of learning predictive mapping of a first cycle predictive composite HSR image of the first time on the basis of the first predictive composite HSR image of the second time using a backward generator, a forward discrimination operation of evaluating accuracy of predictive mapping of the forward generator and discriminating between the input composite HSR image and the first predictive composite HSR image using a forward discriminator, and a backward discrimination operation of evaluating accuracy of predictive mapping of the backward generator and discriminating between the first predictive composite HSR image and the first cycle predictive composite HSR image using a backward discriminator.

The second cycle-GAN may learn predictive mapping of a complementary input composite HSR image corresponding to the input composite HSR image of the first time on the basis of a complementary first predictive composite HSR image obtained by applying a first pixel loss function to the first predictive composite HSR image of the second time using the backward generator, the complementary input composite HSR image obtained by applying a second pixel loss function to the input composite HSR image having a complementary relationship with the input composite HSR image, may learn predictive mapping of a second cycle predictive composite HSR image of the second time on the basis of the complementary input composite HSR image of the first time using the forward generator, may evaluate the accuracy of predictive mapping of the forward generator and discriminate between the complementary input composite HSR image and the second cycle predictive composite HSR image using the forward discriminator, and may evaluate the accuracy of predictive mapping of the backward generator and discriminate between the complementary first predictive composite HSR image and the complementary input composite HSR image using the backward discriminator.

The first cycle-GAN may be trained using a first cycle-consistency loss function so that the first cycle predictive composite HSR image may match the input composite HSR image, the forward discriminator may be trained using a forward adversarial loss function to increase a probability of wrongly determining the first predictive composite HSR image as the input composite HSR image, and the backward discriminator may be trained using a backward adversarial loss function to increase a probability of wrongly determining the first cycle predictive composite HSR image as the first predictive composite HSR image.

The second cycle-GAN may be trained using a second cycle-consistency loss function so that the second cycle predictive composite HSR image may match the complementary first predictive composite HSR image, the forward discriminator may be trained using the forward adversarial loss function to increase a probability of wrongly determining the second cycle predictive composite HSR image as the complementary input composite HSR image, and the backward discriminator may be trained using the backward adversarial loss function to increase a probability of wrongly determining the complementary input composite HSR image as the complementary first predictive composite HSR image.

The cycle-GAN may output, as the resultant composite HSR image, the first predictive composite HSR image, the complementary first predictive composite HSR image, or the second cycle predictive composite HSR image when the first pixel loss function and the second pixel loss function converge on a predetermined reference pixel loss function value and the first cycle-consistency loss function and the second cycle-consistency loss function converge on a predetermined cycle-consistency loss function value.

The forward generator and the backward generator may perform an encoding operation of reducing a size of the input composite HSR image and extracting a plurality of feature maps from the input composite HSR image using an encoder, a recalibration operation of recalibrating the feature maps using a plurality of SE-residual blocks, and a decoding operation of restoring the size of the input composite HSR image reduced by the encoder using a decoder.

The forward discriminator and the backward discriminator may make discriminations in units of patches using a patch-GAN architecture.

Other details of embodiments are included in the detailed descriptions and drawings.

Advantageous Effects

A regional precipitation nowcasting system and method based on cycle-generative adversarial network (GAN) extension according to the present invention allows precipitation nowcasting that is improved in both qualitative and quantitative evaluations.

In a regional precipitation nowcasting system and method based on cycle-GAN extension according to the present invention, pixel losses are applied to a cycle-GAN. Accordingly, robust temporal causality can be ensured.

Effects of the present invention are not limited to those described above, and other effects which have not been described will be clearly understood by those of ordinary skill in the art from the following description.

DESCRIPTION OF DRAWINGS

FIG. 8 is a table showing qualitative evaluation results of the regional precipitation nowcasting system and method based on cycle-GAN extension according to the present invention.

MODES OF THE INVENTION

Figure 1:
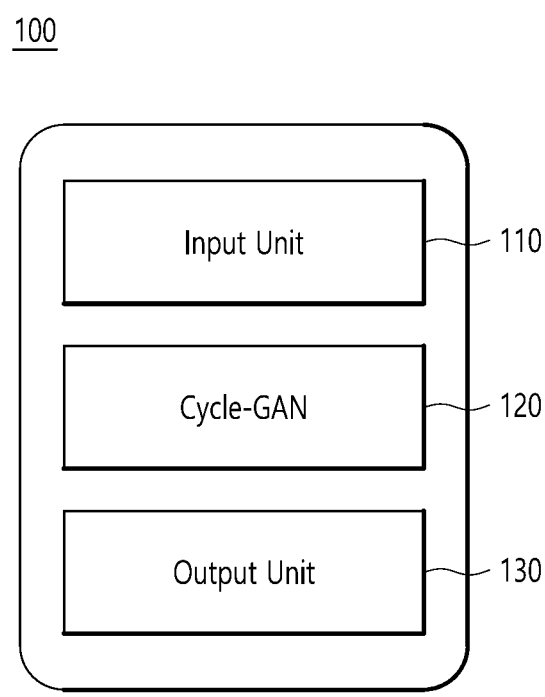
FIG. 1 is a schematic block diagram of a regional precipitation nowcasting system based on cycle-generative adversarial network (GAN) extension according to an embodiment of the present invention.

The advantages and features of the present invention and methods of accomplishing the same may be apparent with reference to the following detailed description of exemplary embodiments and the accompanying drawings. However, the present invention may be embodied in a variety of different forms and is not limited to the embodiments set forth herein. Rather, these embodiments are provided to make this disclosure thorough and complete and fully convey the scope of the present invention to those of ordinary skill in the art. The present invention is only defined by the scope of the claims. Like reference numerals refer to like elements throughout the specification.

The embodiments set forth herein will be described with reference to cross-sectional views and/or plan views which are ideal exemplary diagrams of the present invention. In the drawings, the thicknesses of elements are exaggerated to effectively illustrate the present technology. Therefore, the elements illustrated in the drawings are schematic, and the shapes of the elements exemplify specific shapes of the elements but do not limit the scope of the invention. Terms "first," "second," "third," etc. are used in various embodiments of the present invention to describe various components, but the components should not be limited by the terms. These terms are merely used to distinguish one component from other components. The embodiments described herein include complementary embodiments thereof.

The terminology used herein is for the purpose of describing embodiments and is not intended to limit the present invention. As used herein the singular forms include the plural forms as well unless the context clearly indicates otherwise. The terms "comprises" and/or "comprising," when used in this specification, do not preclude the presence or addition of one or more components, steps, operations, and/or elements other than described components, steps, operations, and/or elements.

Unless otherwise defined, all terms (including technical and scientific terms) used herein may be used in the same meaning as commonly understood by those of ordinary skill in the art. Also, terms defined in commonly used dictionaries are not interpreted in an idealized or excessive manner unless expressly so defined herein.

Hereinafter, the concept of the present invention and embodiments corresponding thereto will be described in detail with reference to the drawings.

A regional precipitation nowcasting system and method based on cycle-generative adversarial network (GAN) extension according to embodiments of the present invention employ a cycle-GAN that assumes the relationship between two domains to be bijection.

In particular, the cycle-GAN is extensively applied to the time-series domain so that an image including precipitation information of a time in the future can be predicted on the basis of an image including current precipitation information.

The cycle-GAN allows unpaired image-to-image conversions using cycle-consistency loss.

FIG. 1 is a schematic block diagram of a regional precipitation nowcasting system based on cycle-GAN extension according to an embodiment of the present invention.

A regional precipitation nowcasting system 100 based on cycle-GAN extension according to the embodiment of the present invention includes an input unit 110, a cycle-GAN 120, and an output unit 130.

The input unit 110 receives an input composite hybrid surface rainfall (HSR) image including precipitation information of a region of interest corresponding to a first time.

The cycle-GAN 120 includes a first cycle-GAN and a second cycle-GAN which is complementary to the first cycle-GAN.

The first cycle-GAN and the second cycle-GAN are used for generating a resultant composite HSR image including precipitation information of a second time on the basis of the input composite HSR image.

The second time is later than the first time and can be, for example, up to a maximum of two hours at intervals of 10 minutes.

The output unit 130 outputs the resultant composite HSR image as a nowcasting image of the region of interest.

The first cycle-GAN and the second cycle-GAN may make temporal causality more robust by performing forward image mapping which temporally goes forward and backward image mapping which temporally goes backward, respectively.

Figure 2:
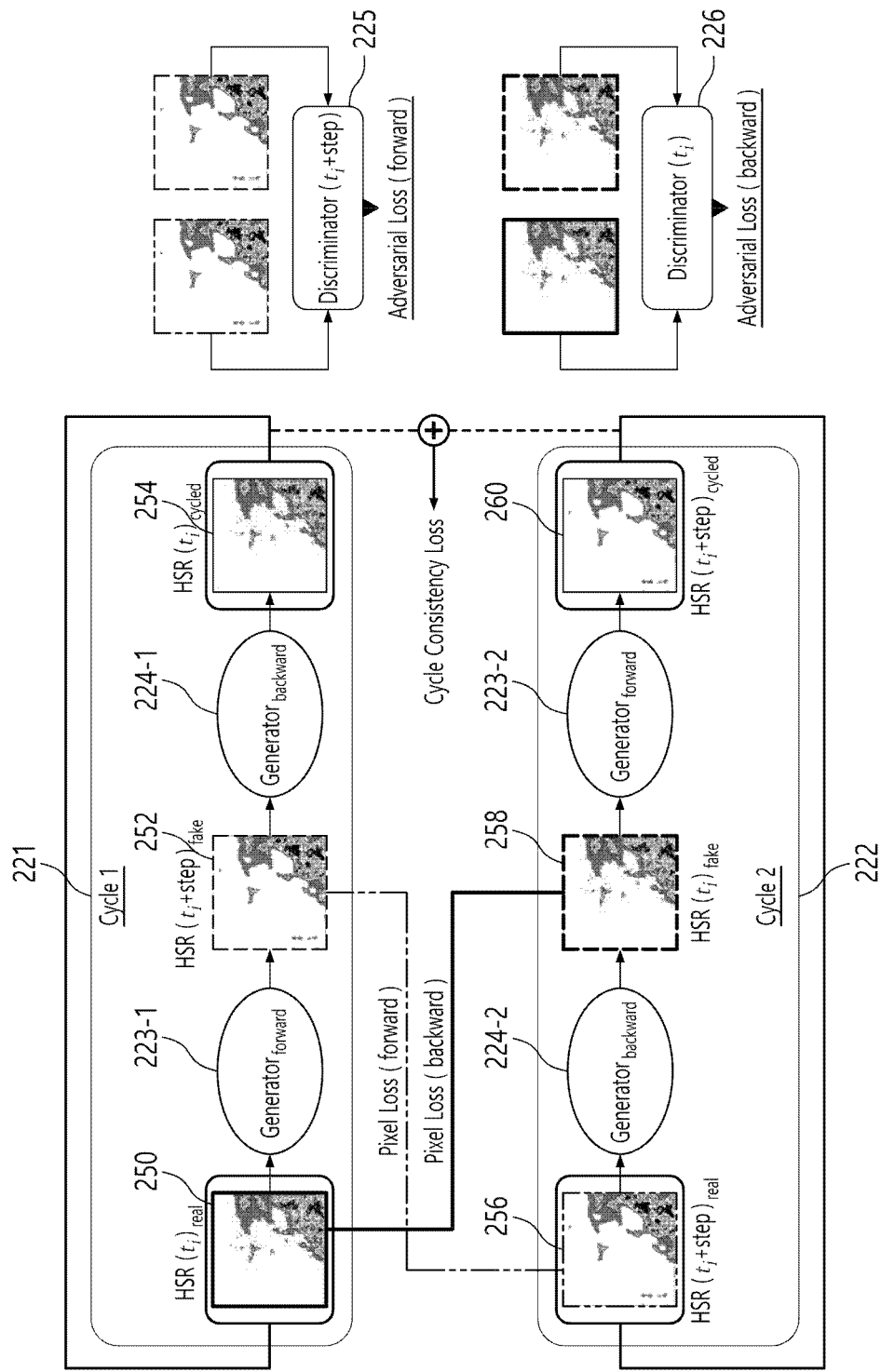
FIG. 2 is a schematic diagram illustrating learning of a cycle-GAN according to the present invention.

FIG. 2 is a schematic diagram illustrating learning of a cycle-GAN according to the present invention.

For clear and simple description, forward generators ($Generator_{forward}$) 223-1 and 223-2, backward generators ($Generator_{backward}$) 224-1 and 224-2, a forward discriminator ($t_{i+step}$) 225, and a backward discriminator ($t_i$) 226 are indicated by $G_f$, $G_b$, $D(t_{i+step})$, and $D(t_i)$, respectively. The two generators $G_f$ and $G_b$ and the two discriminators $D(t_{i+step})$ and $D(t_i)$ are trained through two cycles 221 and 222. $G_f$ and $G_b$ generate composite HSR of a next time step and a previous time step from the input HSR, respectively.

$D(t_{i+step})$ discriminates between fake HSR and real HSR generated by $G_f$. Likewise, $D(t_i)$ discriminates between fake HSR and real HSR generated by $G_b$.

Cycle 1 (221) generates one-step fake future $HSR(t_{i+step})_{fake}$ from real $HSR(t_i)$ and generates cycled HSR $(t_i)_{cycled}$ again from the generated fake future $HSR(t_{i+step})_{fake}$.

In summary, Cycle $1 \triangleq HSR(t_i)_{real} \rightarrow HSR(t_{i+step})_{fake} \rightarrow HSR(t_i)_{cycled}$.

Cycle 2 (222) generates one-step fake past $HSR(t_i)_{fake}$ from real $HSR(t_{i+step})$ and generates cycled $HSR(t_{i+step})_{cycled}$ again from the generated fake past HSR $(t_i)_{fake}$.

In summary, Cycle $2 \triangleq HSR(t_{i+step})_{real} \rightarrow HSR(t_i)_{fake} \rightarrow HSR(t_{i+step})_{cycled}$.

The final goal of the learning model shown in FIG. 2 is to make real, fake, and cycled HSR identical.

In other words, it should be $HSR(t_i)_{real} \approx HSR(t)_{fake} \approx HSR(t_i)_{cycled}$ and $HSR(t_{i+step})_{real} \approx HSR(t_{i+step})_{fake} \approx HSR(t_{i+step})_{cycled}$ after learning.

The first cycle-GAN 221 includes a forward generator 223-1, a backward generator 224-1, the forward discriminator 225, and the backward discriminator 226.

The forward generator 223-1 learns predictive mapping of a first predictive composite HSR image 252 of the second time on the basis of an input composite HSR image 250 of the first time.

The second time is later than the first time.

The backward generator 224-1 learns predictive mapping of a first cycle predictive composite HSR image 254 of the first time on the basis of the first predictive composite HSR image 252 of the second time.

The forward discriminator 225 evaluates the accuracy of predictive mapping of the forward generator 223-1 and discriminates between the input composite HSR image 250 and the first predictive composite HSR image 252.

The backward discriminator 226 evaluates the accuracy of predictive mapping of the backward generator 224-1 and discriminates between the first predictive composite HSR image 252 and the first cycle predictive composite HSR image 254.

The second cycle-GAN 222 includes a backward generator 224-2, a forward generator 223-2, the forward discriminator 225, and the backward discriminator 226.

The backward generator 224-2 learns predictive mapping of a complementary input composite HSR image 258 corresponding to the input composite HSR image 250 of the first time on the basis of a complementary first predictive composite HSR image 256 obtained by applying a first pixel loss function (pixel loss forward) to the first predictive composite HSR image 252 of the second time. The complementary input composite HSR image 258 obtained by applying a second pixel loss function (pixel loss backward) to the input composite HSR image 250 may be in a complementary relationship with the input composite HSR image 250.

The forward generator 223-2 learns predictive mapping of a second cycle predictive composite HSR image 260 of the second time on the basis of the complementary input composite HSR image 258 of the first time.

The forward discriminator 225 evaluates the accuracy of predictive mapping of the forward generator 223-2 and discriminates between the complementary input composite HSR image 258 and the second cycle predictive composite HSR image 260.

The backward discriminator 226 evaluates the accuracy of predictive mapping of the backward generator 224-2 and discriminates between the complementary first predictive composite HSR image 256 and the complementary input composite HSR image 258.

The forward generator 223-1 of the first cycle-GAN 221 and the forward generator 223-2 of the second cycle-GAN 222 according to the present invention have the same network architecture.

The backward generator 224-1 of the first cycle-GAN 221 and the backward generator 224-2 of the second cycle-GAN 222 according to the present invention have the same network architecture.

A forward generator and a backward generator according to the embodiment of the present invention have the same network architecture.

According to the present invention, the forward discriminator 225 and the backward discriminator 226 of the first cycle-GAN 221 have the same network architecture as the forward discriminator 225 and the backward discriminator 226 of the second cycle-GAN 222.

A forward discriminator and a backward discriminator according to the embodiment of the present invention have the same network architecture.

The first cycle-GAN 221 of the present invention is trained using a first cycle-consistency loss function so that the first cycle predictive composite HSR image 254 matches the input composite HSR image 250.

The forward discriminator 225 is trained using a forward adversarial loss function to increase a probability of wrongly determining the first predictive composite HSR image 252 as the input composite HSR image 250.

The backward discriminator 226 is trained using a backward adversarial loss function to increase a probability of wrongly determining the first cycle predictive composite HSR image 254 as the first predictive composite HSR image 252.

The second cycle-GAN 222 is trained using a second cycle-consistency loss function so that the second cycle predictive composite HSR image 260 matches the complementary first predictive composite HSR image 256.

The forward discriminator 225 is trained using a forward adversarial loss function to increase a probability of wrongly determining the second predictive composite HSR image 260 as the complementary first predictive composite HSR image 256.

The backward discriminator 226 is trained using a backward adversarial loss function to increase a probability of wrongly determining the complementary input composite HSR image 258 as the complementary first predictive composite HSR image 256.

As a resultant composite HSR image, the cycle-GAN 120 outputs the first predictive composite HSR image, the complementary first predictive composite HSR image, or the second cycle predictive composite HSR image when the first pixel loss function and the second pixel loss function converge on a predetermined reference pixel loss function value and the first cycle-consistency loss function and the second cycle-consistency loss function converge on a predetermined cycle-consistency loss function value.

The output unit 130 outputs the resultant composite HSR image as a nowcasting image of the region of interest.

As shown in FIG. 2, the learning model for precipitation nowcasting includes two cycles Cycle 1 and Cycle 2 and uses composite HSR as data. As shown in FIG. 2, in the regional precipitation nowcasting system based on cycle-GAN extension according to the present invention, a total of four different networks are trained in two cycles.

The forward generators Generator$_{forward}$ and the backward generators Generator$_{backward}$ learn image mapping from the present to the future and from the future to the present, respectively. An image including future precipitation information is predicted by performing image mapping.

The forward discriminator ($t_{i+step}$) and the backward discriminator ($t_i$) evaluate mapping accuracy of the forward generators Generator$_{forward}$ and the backward generators Generator$_{backward}$.

Input data HSR$_i$ used as an input to the model is represented by Expression (1).

$$HSR_i \triangleq (HSR(t_i)_{real}, HSR(t_{i+step})_{real}), \qquad (1)$$

Here, $t_i$ is an arbitrary element of $T_n=\{t_1, t_2, \ldots, t_n\}$ the arithmetic sequence of discrete-time: $n \in \mathbb{Z}^+$, $i \in \mathbb{Z}^+$, step$\in \mathbb{Z}^+$ and i+step$\leq$n, HSR($t_i$)$_{real}$ represents real HSR data at time $t_i$. Cycle 1, which predicts future precipitation information on the basis of known current precipitation information and predicts present precipitation information again from the predicted future precipitation information, is represented by Expression (2):

$$\text{Cycle 1} \triangleq HSR(t_i)_{real} \xrightarrow{G_f} HSR(t_{i+step})_{fake} \xrightarrow{G_b} HSR(t_i)_{cycled}, \qquad (2)$$

Here, the subscripts "fake" and "cycled" represent data generated from real and data generated from fake, respectively. $G_f$ and $G_b$ indicate the forward generators Generator$_{forward}$ and the backward generators Generator$_{backward}$ of FIG. 2.

Cycle 2, which predicts the present from the known future and predicts the future again from the predicted present, is represented by Expression (3):

$$\text{Cycle 2} \triangleq HSR(t_{i+step})_{real} \xrightarrow{G_b} HSR(t_i)_{fake} \xrightarrow{G_f} HSR(t_{i+step})_{cycled}, \qquad (3)$$

In Expression (3), variables are identical to those in Expression (2). In addition, the forward discriminator ($t_{i+step}$) and the backward discriminator ($t_i$) are denoted by D($t_{i+step}$) and D($t_i$), respectively.

Therefore, $\delta(t_{i+step})_{real}$, $\delta(t_{i+step})_{fake}$, $\delta(t_i)_{real}$ and $\delta(t_i)_{fake}$ which are outputs of D($t_{i+step}$) and D($t_i$) are represented by Expressions (4) to (7):

$$\delta(t_{i+step})_{real} \triangleq D(t_{i+step})(HSR(t_{i+step})_{real}), \qquad (4)$$

$$\delta(t_{i+step})_{fake} \triangleq D(t_{i+step})(HSR(t_{i+step})_{fake}), \qquad (5)$$

$$\delta(t_i)_{real} \triangleq D(t_i)(HSR(t_i)_{real}), \qquad (6)$$

$$\delta(t_i)_{fake} \triangleq D(t_i)(HSR(t_i)_{fake}), \qquad (7)$$

Further, L1($t_{i+step}$)$_{fake}$, L1($t_{i+step}$)$_{cycled}$, L1($t_i$)$_{fake}$ and L1($t_i$)$_{cycled}$ are represented by Expressions (8) to (11):

$$L1(t_{i+step})_{fake} \triangleq \|HSR(t_{i+step})_{fake} - HSR(t_{i+step})_{real}\|_1, \qquad (8)$$

$$L1(t_{i+step})_{cycled} \triangleq \|HSR(t_{i+step})_{cycled} - HSR(t_{i+step})_{real}\|_1, \qquad (9)$$

$$L1(t_i)_{fake} \triangleq \|HSR(t_i)_{fake} - HSR(t_i)_{real}\|_1, \qquad (10)$$

$$L1(t_i)_{cycled} \triangleq \|HSR(t_i)_{cycled} - HSR(t_i)_{real}\|_1. \qquad (11)$$

5 The cycle-GAN of the present invention receives HSR$_i$ as an input and distributes HSR($t_i$)$_{real}$ and HSR($t_{i+step}$)$_{real}$ to Cycle 1 and Cycle 2, respectively. With the complementary optimization of Cycle 1 and Cycle 2, the learning model can obtain robust temporal causality.

The cycle-GAN of the present invention may be optimized using three types of loss functions, that is, an adversarial loss function, a cycle-consistency loss function, and a pixel loss function.

The cycle-GAN of the present invention uses adversarial losses to match the distributions of HSR($t_{i+step}$)$_{real}$ and HSR($t_{i+step}$)$_{fake}$ (forward adversarial loss).

Likewise, the cycle-GAN of the present invention also uses adversarial losses to match the distributions of HSR($t_i$)$_{real}$ and HSR($t_i$)$_{fake}$ (backward adversarial loss).

The present invention adopts adversarial losses of least square GANs (LSGANs) and extends the adversarial losses for two complementary cycles.

In other words, adversarial losses of the cycle-GAN of the present invention are represented by Expressions (12) to (15):

$$\mathcal{L}_{adv}(D(t_{i+step})) = \frac{1}{2}\mathbb{E}_{HSR(t_{i+step})_{real} \sim p(t_{i+step})}\left[(\delta(t_{i+step})_{real} - 1)^2\right] + \qquad (12)$$
$$\frac{1}{2}\mathbb{E}_{HSR(t_i)_{real} \sim p(t_i)}\left[(\delta(t_{i+step})_{fake})^2\right],$$

$$\mathcal{L}_{adv}(G_f) = \frac{1}{2}\mathbb{E}_{HSR(t_i)_{real} \sim p(t_i)}\left[(\delta(t_{i+step})_{fake} - 1)^2\right], \qquad (13)$$

$$\mathcal{L}_{adv}(D(t_i)) = \frac{1}{2}\mathbb{E}_{HSR(t_i)_{real} \sim p(t_i)}\left[(\delta(t_i)_{real} - 1)^2\right] + \qquad (14)$$
$$\frac{1}{2}\mathbb{E}_{HSR(t_{i+step})_{real} \sim p(t_{i+step})}\left[(\delta(t_i)_{fake})^2\right],$$

$$\mathcal{L}_{adv}(G_b) = \frac{1}{2}\mathbb{E}_{HSR(t_{i+step})_{real} \sim p(t_{i+step})}\left[(\delta(t_i)_{fake} - 1)^2\right], \qquad (15)$$

Here, p($t_{i+step}$) and p($t_i$) denote the distributions of HSR ($t_{i+step}$)$_{real}$ and HSR($t_i$)$_{real}$, respectively.

The cycle-GAN of the present invention applies cycle-consistency loss to the time-series domain to enhance temporal causality. The cycle-consistency loss is used for satisfying Expressions (16) and (17).

$$HSR(t_{i+step})_{cycled} \approx HSR(t_{i+step})_{real}, \qquad (16)$$

$$HSR(t_i)_{cycled} \approx HSR(t_i)_{real}. \qquad (17)$$

Therefore, the cycle-consistency loss function may be represented by Expression (18):

$$\mathcal{L}_{cyc}(G_f, G_b) = \mathbb{E}_{HSR(t_i+step)_{real} \sim p(t_i+step)}[L1(t_{i+step})_{cycled}] + \mathbb{E}_{HSR(t_i)_{real} \sim p(t_i)}[L1(t_i)_{cycled}]. \quad (18)$$

The cycle-GAN of the present invention uses pixel losses with adversarial losses to satisfy the following conditions.

$$HSR(t_{i+step})_{real} \approx HSR(t_{i+step})_{fake}, \quad (19)$$

$$HSR(t_i)_{real} \approx HSR(t_i)_{fake}. \quad (20)$$

To satisfy Expressions (19) and (20), a pixel loss (forward) $\mathcal{L}_{pix}(G_f)$ and a pixel loss (backward) $\mathcal{L}_{pix}(G_b)$ are as follows:

$$\mathcal{L}_{pix}(G_f) = \mathbb{E}_{HSR_i \sim (p(t_i), p(t_{i+step}))}[L1(t_{i+step})_{fake}], \quad (21)$$

$$\mathcal{L}_{pix}(G_b) = \mathbb{E}_{HSR_i \sim (p(t_i), p(t_{i+step}))}[L1(t_i)_{fake}], \quad (22)$$

Here, $p(t_i)$ and $p(t_{i+step})$ indicate the distributions of $HSR(t_i)_{real}$ and $HSR(t_{i+step})_{real}$, respectively.

For performance improvement, identity loss is additionally adopted in conventional cycleGANs. However, the identity loss is not applied to the present invention because the identity loss breaks temporal causality. For example, the forward generators $G_f$ of the present invention represent mapping from the present to the future, but when the identity loss is added, may represent mapping from the present to the present. The present invention helps the forward generator $G_f$ and the backward generator Gt to capture a temporal change by adding pixel losses instead of the identity loss.

According to Expressions (12) to (15), (21), and (22), total objective functions are as follows:

$$\min_{D(t_{i+step})}: \mathcal{L}(D(t_{i+step})) = \mathcal{L}_{adv}(D(t_{i+step})), \quad (23)$$

$$\min_{G_f}: \mathcal{L}(G_f) = \mathcal{L}_{adv}(G_f) + \lambda_{cyc}\mathcal{L}_{cyc}(G_f, G_b) + \lambda_{pix}\mathcal{L}_{pix}(G_f), \quad (24)$$

$$\min_{D(t_i)}: \mathcal{L}(D(t_i)) = \mathcal{L}_{adv}(D(t_i)), \quad (25)$$

$$\min_{G_b}: \mathcal{L}(G_b) = \mathcal{L}_{adv}(G_b) + \lambda_{cyc}\mathcal{L}_{cyc}(G_f, G_b) + \lambda_{pix}\mathcal{L}_{pix}(G_b), \quad (26)$$

Here, $\lambda_{cyc} \in R^+$ and $\lambda_{pix} \in R^+$ control relative importance. The objective functions satisfy Expressions (16), (17), (19), and (20): accordingly, the model can achieve the following final goals of Expressions (27) and (28):

$$HSR(t_{i+step})_{real} \approx HSR(t_{i+step})_{fake} \quad (27)$$
$$\approx HSR(t_{i+step})_{cycled},$$

$$HSR(t_i)_{real} \approx HSR(t_i)_{fake} \quad (28)$$
$$\approx HSR(t_i)_{cycled}.$$

The goals of Expressions (27) and (28) are to secure the temporal causality of Cycle 1 and Cycle 2.

Figure 3:
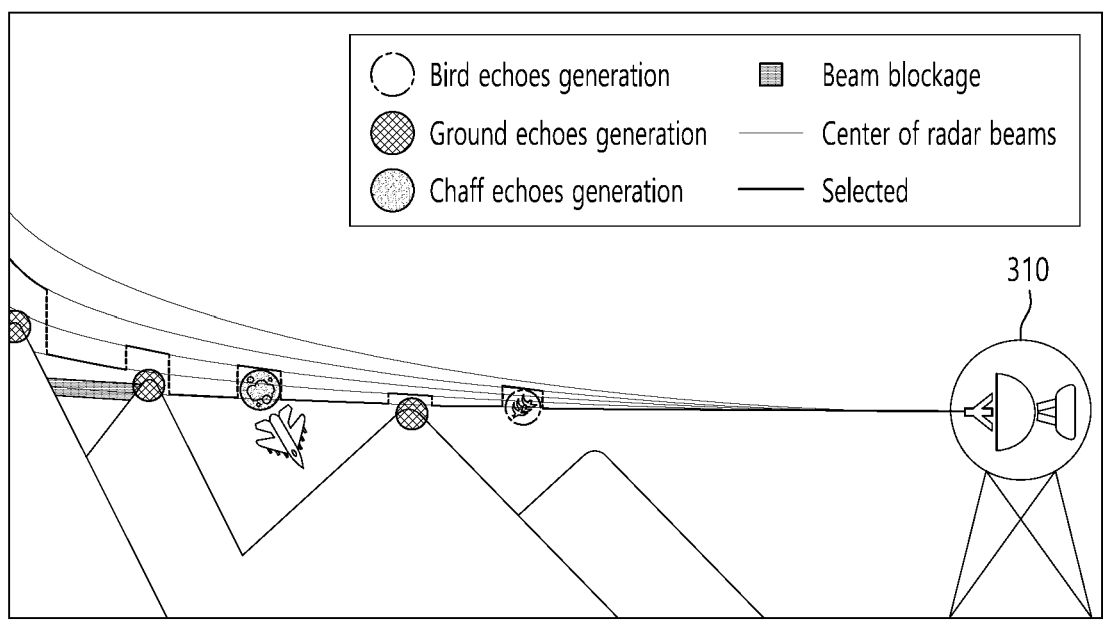
FIG. 3 is a schematic diagram illustrating generation of composite hybrid surface rainfall (HSR) data according to the present invention.

FIG. 3 is a schematic diagram illustrating generation of composite HSR data according to the present invention.

As shown in FIG. 3, HSR data selects the reflectivity of a beam that is closest to the ground at each horizontal distance from a weather radar 310 and less affected by non-meteorological echoes and beam blockages. The non-meteorological echoes include bird echoes, ground echoes, chaff echoes, etc., which are major obstacles to precipitation estimation.

The collected reflectivity data is converted into HSR data through a reflectivity-rainfall equation in which regional characteristics are taken into consideration. HSR data is currently being used for weather forecasts in Korea.

Figure 4:
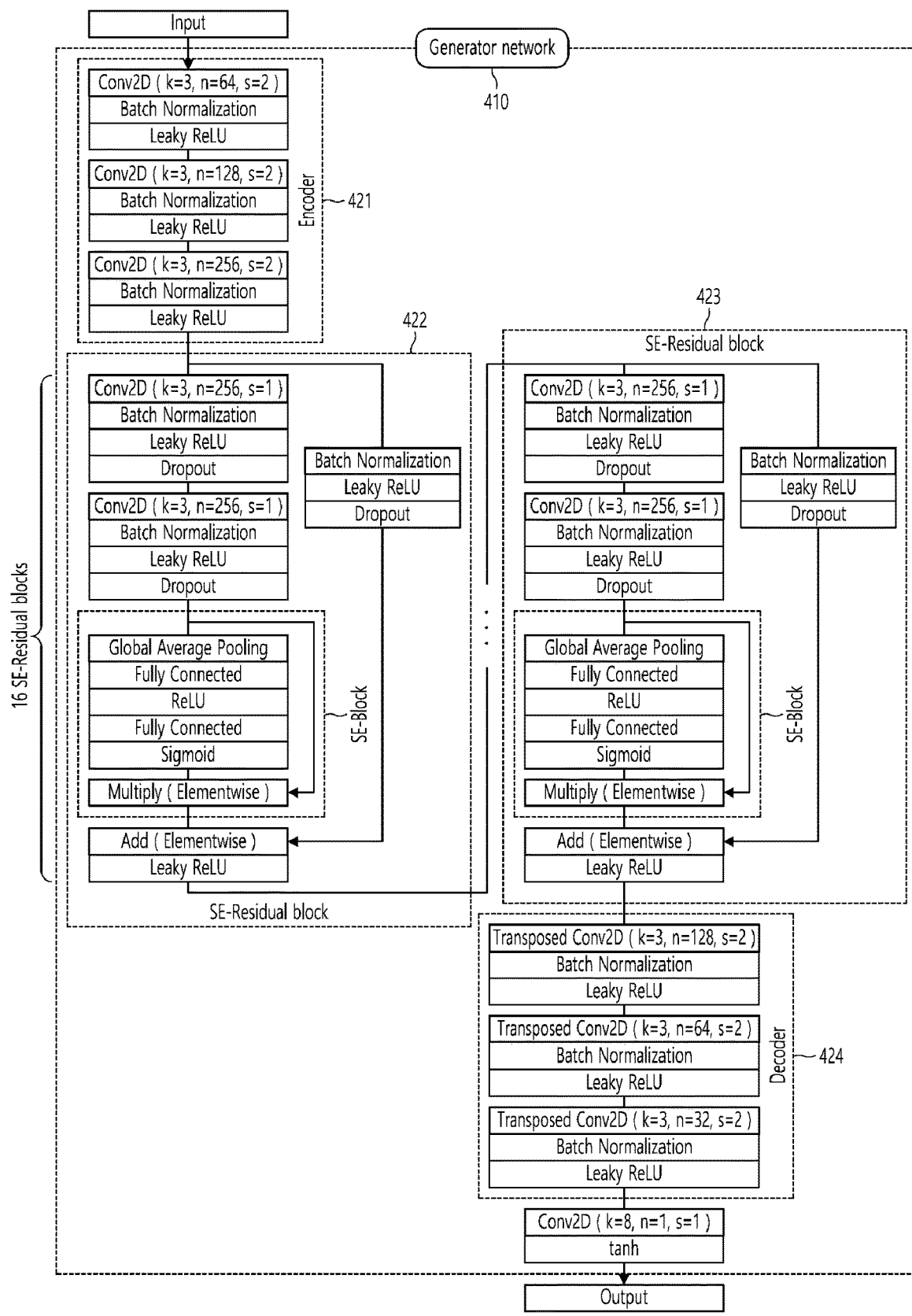
FIG. 4 is a block diagram illustrating a network architecture of a forward generator and a backward generator according to the present invention.

FIG. 4 is a block diagram illustrating a network architecture of a forward generator and a backward generator according to the present invention.

A forward generator and a backward generator according to the embodiment of the present invention have the same network architecture.

A forward discriminator and a backward discriminator according to the embodiment of the present invention have the same network architecture.

A generator network 410 including the forward generators 223 and the backward generators 224 may be configured as shown in FIG. 4.

The generator network 410 includes an encoder 421, a plurality of squeeze-and-excitation (SE)-residual blocks 423, and a decoder 424.

The encoder 421 reduces the size of an input composite HSR image and extracts a plurality of feature maps from the input composite HSR image.

The plurality of SE-residual blocks 423 may include, for example, 16 residual blocks. The SE-residual blocks 423 recalibrate feature maps. The SE-residual blocks are a core part of the generator network, a combination of a residual block and an SE block. Dropout layers are added to the residual blocks for robustness. The present invention uses a small number of residual blocks and thus does not use a bottleneck block according to the design policy of the original ResNet.

The decoder 424 restores the size of the input composite HSR image which is reduced by the encoder 421. A convolution layer just before the output is for fine resizing, and tan h is used as a final activation function.

Figure 5:
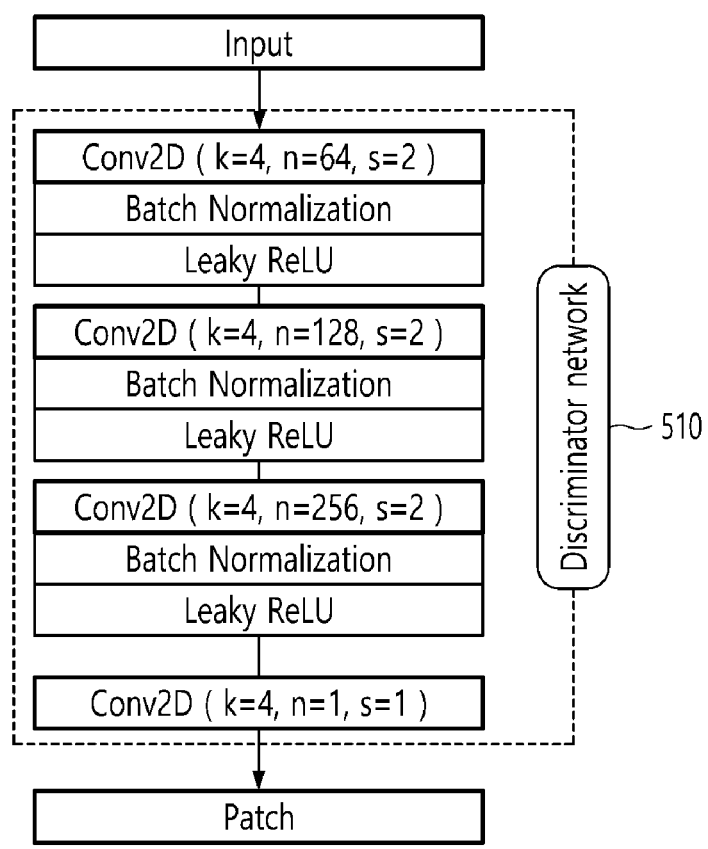
FIG. 5 is a block diagram illustrating a network architecture of a forward discriminator and a backward discriminator according to the present invention.

FIG. 5 is a block diagram illustrating a network architecture of a forward discriminator and a backward discriminator according to the present invention.

The forward discriminator and the backward discriminator use the architecture of patch-GAN which makes discriminations in units of patches.

The discriminator network classifies whether an output data patch is real or fake. A patch-unit discriminator is lighter than a full-data discriminator. According to the embodiment, the discriminator network of the present invention uses a 31×31 patch size. It is obvious to those of ordinary skill in the art that the patch size can be flexibly changed according to the size of input data.

Figure 6:
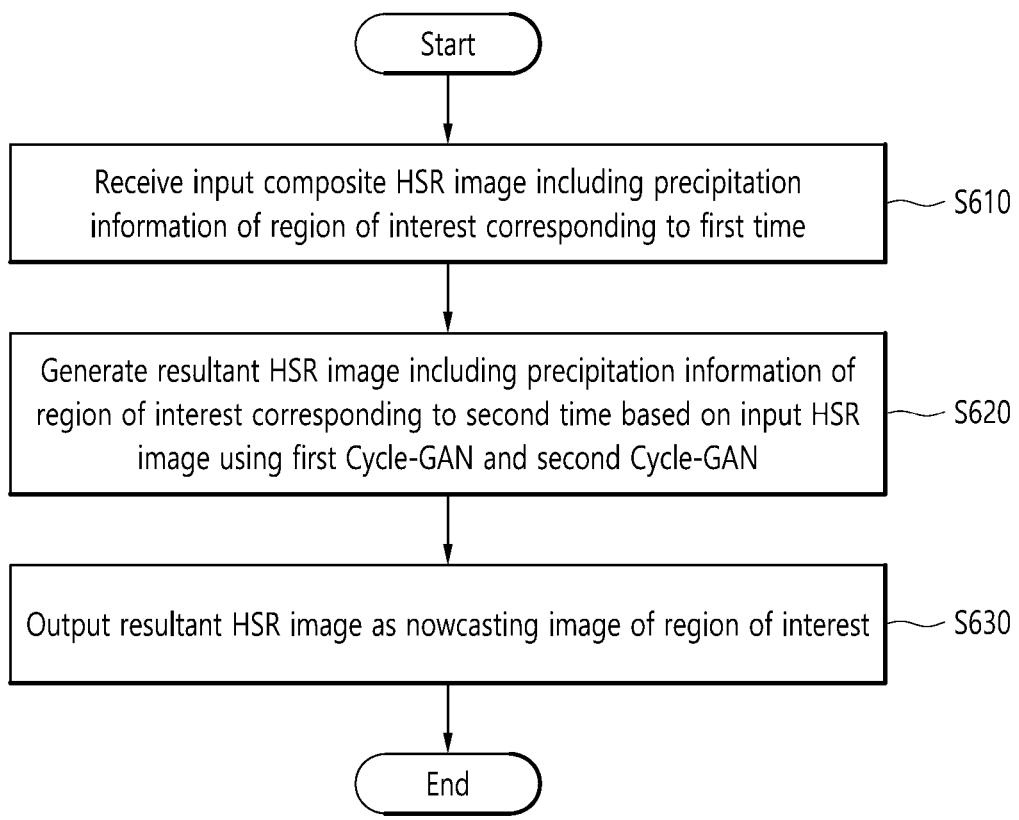
FIG. 6 is a schematic flowchart of a regional precipitation nowcasting method based on cycle-GAN extension according to an embodiment of the present invention.

FIG. 6 is a schematic flowchart of a regional precipitation nowcasting method based on cycle-GAN extension according to an embodiment of the present invention.

A regional precipitation nowcasting method 600 based on cycle-GAN extension according to another embodiment of the present invention includes an input data receiving operation S610 of receiving an input composite HSR image including precipitation information of a region of interest corresponding to a first time.

The regional precipitation nowcasting method 600 includes a cycle-GAN execution operation S620 of generating, on the basis of the input composite HSR image, a resultant composite HSR image including precipitation information of the region of interest corresponding to a second time which comes later than the first time.

The regional precipitation nowcasting method 600 includes an output operation S630 of outputting the resultant composite HSR image as a nowcasting image of the region of interest.

A cycle-GAN of the present invention includes a first cycle-GAN and a second cycle-GAN which is complementary to the first cycle-GAN.

The first cycle-GAN and the second cycle-GAN of the cycle-GAN perform forward image mapping which temporally goes forward and backward image mapping which temporally goes backward, respectively.

The first cycle-GAN performs a forward image mapping operation of learning predictive mapping of a first predictive composite HSR image of the second time on the basis of the input composite HSR image of the first time using a forward generator, a backward image mapping operation of learning predictive mapping of a first cycle predictive composite HSR image of the first time on the basis of the first predictive composite HSR image of the second time using a backward generator, a forward discrimination operation of evaluating the accuracy of predictive mapping of the forward generator and discriminating between the input composite HSR image and the first predictive composite HSR image, and a backward discrimination operation of evaluating the accuracy of predictive mapping of the backward generator and discriminating between the first predictive composite HSR image and the first cycle predictive composite HSR image.

The second cycle-GAN is configured to learn predictive mapping of a complementary input composite HSR image corresponding to the input composite HSR image of the first time on the basis of a complementary first predictive composite HSR image obtained by applying a first pixel loss function to the first predictive composite HSR image of the second time using the backward generator, the complementary input composite HSR image obtained by applying a second pixel loss function to the input composite HSR image having a complementary relationship with the input composite HSR image, to learn predictive mapping of a second cycle predictive composite HSR image of the second time on the basis of the complementary input composite HSR image of the first time using the forward generator, to evaluate the accuracy of predictive mapping of the forward generator and discriminate between the complementary input composite HSR image and the second cycle predictive composite HSR image using the forward discriminator, and to evaluate the accuracy of predictive mapping of the backward generator and discriminate between the complementary first predictive composite HSR image and the complementary input composite HSR image using the backward discriminator.

The first cycle-GAN is trained using a first cycle-consistency loss function so that the first cycle predictive composite HSR image may match the input composite HSR image.

The forward discriminator is trained using a forward adversarial loss function to increase a probability of wrongly determining the first predictive composite HSR image as the input composite HSR image.

The backward discriminator is trained using a backward adversarial loss function to increase a probability of wrongly determining the first cycle predictive composite HSR image as the first predictive composite HSR image.

The second cycle-GAN is trained using a second cycle-consistency loss function so that the second cycle predictive composite HSR image may match the complementary first predictive composite HSR image.

The forward discriminator is trained using the forward adversarial loss function to increase a probability of wrongly determining the second cycle predictive composite HSR image as the complementary input composite HSR image.

The backward discriminator is trained using the backward adversarial loss function to increase a probability of wrongly determining the complementary input composite HSR image as the complementary first predictive composite HSR image.

As the resultant composite HSR image, the cycle-GAN outputs the first predictive composite HSR image, the complementary first predictive composite HSR image, or the second cycle predictive composite HSR image when the first pixel loss function and the second pixel loss function converge on a predetermined reference pixel loss function value and the first cycle-consistency loss function and the second cycle-consistency loss function converge on a predetermined cycle-consistency loss function value.

Each of the forward generator and the backward generator of the cycle-GAN of the present invention is configured to perform an encoding operation of reducing the size of the input composite HSR image and extracting a plurality of feature maps from the input composite HSR image using an encoder, a recalibration operation of recalibrating the feature maps using a plurality of SE-residual blocks, and a decoding operation of restoring the size of the input composite HSR image reduced by the encoder using a decoder.

The forward discriminator and the backward discriminator of the cycle-GAN of the present invention make discriminations in units of patches using a patch-GAN architecture.

Figure 7:
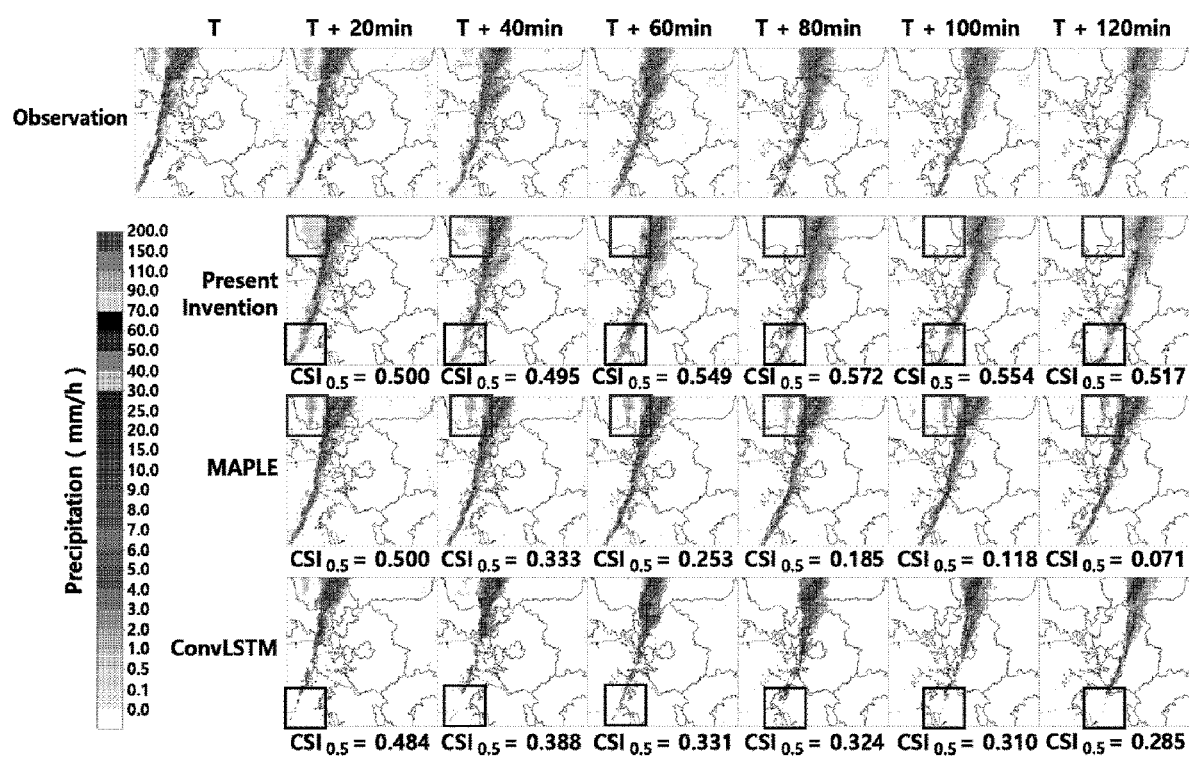
FIG. 7 is a set of views showing qualitative evaluation results of the regional precipitation nowcasting system and method based on cycle-GAN extension according to the present invention.

FIG. 7 is a set of views showing qualitative evaluation results of the regional precipitation nowcasting system and method based on cycle-GAN extension according to the present invention.

In FIG. 7, the present invention is compared with two conventional models for qualitative evaluation. The first model is a McGill algorithm for precipitation nowcasting by Lagrangian extrapolation (MAPLE) which is a quantitative precipitation forecast (QPF) model. The second model is convolutional long short-term memory (ConvLSTM) based on recurrent neural networks (RNNs).

Both models are currently used in weather radar operating systems and are methods that have been sufficiently verified in real life.

For qualitative evaluation, a critical success index (CSI) is used as a metric.

As shown in FIG. 7, in experimental results of the CSI-based qualitative evaluation, the regional precipitation nowcasting method based on cycle-GAN extension according to the present invention ensured the highest score at all points in time.

The CSI of the method of the present invention remained relatively uniform compared to the CSI of the two conventional models during a lead time of two hours.

In particular, the regional precipitation nowcasting method based on cycle-GAN extension according to the present invention predicted the extinction of radar echoes better than MAPLE and details of radar echoes better than ConvLSTM.

FIG. 8 is a table showing qualitative evaluation results of the regional precipitation nowcasting system and method based on cycle-GAN extension according to the present invention.

Referring to FIG. 8, peak signal-to-noise ratio (PSNR) and structural similarity index measure (SSIM) are used as metrics for quantitative evaluation.

As shown in Table 1, the proposed method scored the best in PSNR and SSIM except for the first 10 minutes of prediction.

Referring to FIGS. 7 and 8, the regional precipitation nowcasting system and method based on cycle-GAN extension according to the present invention showed higher scores in CSI, PSNR, and SSIM than the conventional methods.

Figure 9:
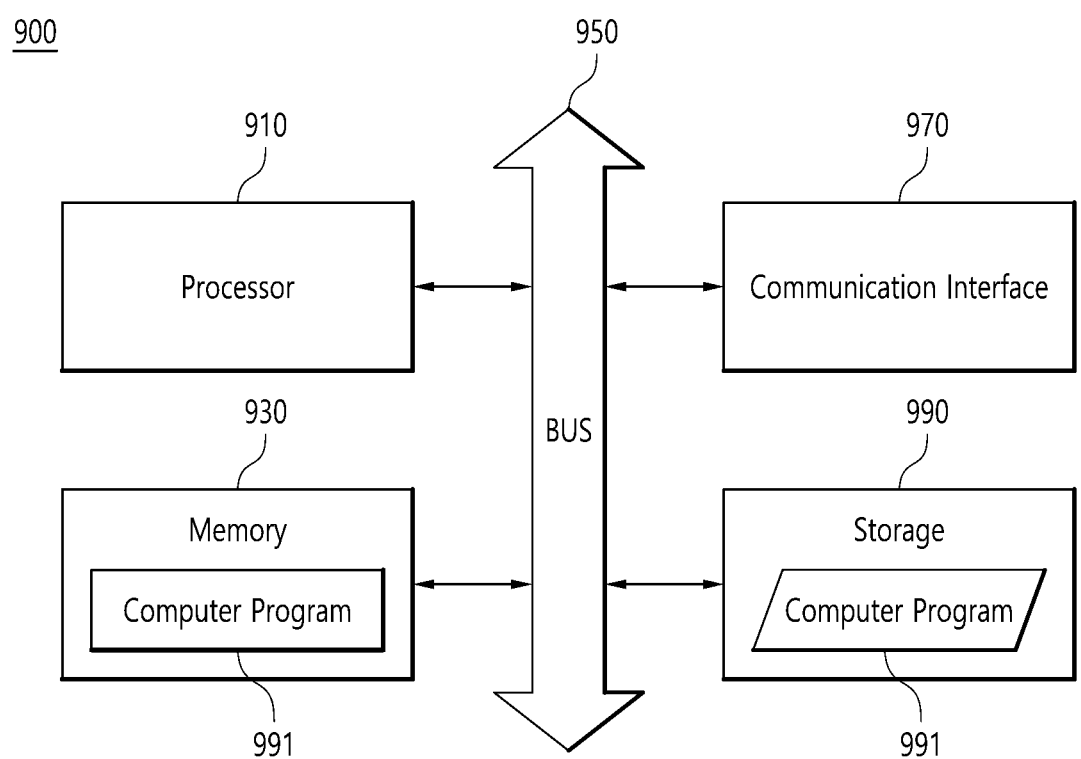
FIG. 9 is a diagram illustrating an exemplary computing device for implementing a device and/or system according to various embodiments of the present invention.

FIG. 9 is a diagram illustrating an exemplary computing device for implementing a device and/or system according to various embodiments of the present invention.

An exemplary computing device 900 for implementing devices according to some embodiments of the present disclosure will be described in further detail with reference to FIG. 9.

The computing device 900 may include at least one processor 910, a bus 950, a communication interface 970, a memory 930 for loading a computer program 991 executed by the processor 910, and a storage 990 for storing the computer program 991. However, only components related to embodiments of the present disclosure are shown in FIG. 9.

Therefore, those skilled in the technical field to which the present disclosure pertains may understand that general-use components other than those shown in FIG. 9 can be further included.

The processor 910 controls overall operations of each component of the computing device 900. The processor 910 may include a central processing unit (CPU), a microprocessor unit (MPU), a microcontroller unit (MCU), a graphics processing unit (GPU), or any type of processor well-known in the technical field of the present disclosure. Also, the processor 910 may perform calculation for at least one application or program for performing the method according to embodiments of the present disclosure. The computing device 900 may include one or more processors. The computing device 900 may be artificial intelligence (AI).

The memory 930 stores various types of data, instructions, and/or information. To perform the method according to embodiments of the present disclosure, at least one program 991 may be loaded from the storage 990 to the memory 930. The memory 930 may be implemented as a volatile memory, such as a random access memory (RAM), but the technical scope of the present disclosure is not limited thereto.

The bus 950 provides a communication function among components of the computing device 900. The bus 950 may be implemented in various forms of buses such as an address bus, a data bus, a control bus, etc.

The communication interface 970 supports wired or wireless Internet communication of the computing device 900. Also, the communication interface 970 may support various communication methods other than Internet communication. To this end, the communication interface 970 may include a communication module well-known in the technical field of the present disclosure.

According to some embodiments, the communication interface 970 may be omitted.

The storage 990 may non-temporarily store the at least one program 991 and various types of data.

The storage 990 may include a non-volatile memory, such as a read-only memory (ROM), an erasable programmable ROM (EPROM), an electrically erasable programmable ROM (EEPROM), a flash memory, etc., a hard disk, a removable disk, or any form of computer-readable recording medium well-known in the technical field to which the present disclosure pertains.

The computer program 991 may include one or more instructions that, when loaded to the memory 930, cause the processor 910 to perform the method/operations according to various embodiments of the present disclosure. In other words, the processor 910 may perform a method and/or operations according to various embodiments of the present disclosure by executing the one or more instructions.

Although exemplary embodiments of the present invention have been illustrated and described above, the present invention is not limited to the specific embodiments set forth herein. Various modifications can be made by those skilled in the technical field to which the present invention pertains without departing from the spirit of the present invention described in the claims, and these modified embodiments should not be separately understood from the technical spirit or perspective of the present invention.

The invention claimed is:

1. A regional precipitation nowcasting system based on cycle-generative adversarial network (GAN) extension, the system comprising:
  an input processor configured to receive an input composite hybrid surface rainfall (HSR) image including precipitation information of a region of interest corresponding to a first time;
  a cycle-GAN configured to generate a resultant composite HSR image including precipitation information of the region of interest corresponding to a second time which is later than the first time, based on the input composite HSR image,
    wherein the cycle-GAN comprises a first cycle-GAN and a second cycle-GAN which is complementary to the first cycle-GAN, and
    wherein the first cycle-GAN and the second cycle-GAN are configured to perform forward image mapping, which temporally goes forward, and backward image mapping, which temporally goes backward, respectively; and
  an output processor configured to output the resultant composite HSR image as a nowcasting image of the region of interest.

2. The regional precipitation nowcasting system of claim 1, wherein the first cycle-GAN comprises:
  a forward generator configured to learn predictive mapping of a first predictive composite HSR image of the second time based on the input composite HSR image of the first time;
  a backward generator configured to learn predictive mapping of a first cycle predictive composite HSR image of the first time based on the first predictive composite HSR image of the second time;
  a forward discriminator configured to evaluate an accuracy of the predictive mapping of the forward generator and discriminate between the input composite HSR image and the first predictive composite HSR image; and
  a backward discriminator configured to evaluate an accuracy of the predictive mapping of the backward generator and discriminate between the first predictive composite HSR image and the first cycle predictive composite HSR image.

3. The regional precipitation nowcasting system of claim 2, wherein the second cycle-GAN is configured to:
  learn predictive mapping of a complementary input composite HSR image corresponding to the input composite HSR image of the first time based on a complementary first predictive composite HSR image obtained by applying a first pixel loss function to the first predictive composite HSR image of the second time using the backward generator, wherein the complementary input composite HSR image obtained by applying a second pixel loss function to the input composite HSR image has a complementary relationship with the input composite HSR image;
  learn predictive mapping of a second cycle predictive composite HSR image of the second time based on the complementary input composite HSR image of the first time using the forward generator;
  evaluate the accuracy of the predictive mapping of the forward generator and discriminate between the complementary input composite HSR image and the second cycle predictive composite HSR image using the forward discriminator; and
  evaluate the accuracy of the predictive mapping of the backward generator and discriminate between the complementary first predictive composite HSR image and the complementary input composite HSR image using the backward discriminator.

4. The regional precipitation nowcasting system of claim 3, wherein the first cycle-GAN is trained using a first cycle-consistency loss function and the first cycle predictive composite HSR image matches the input composite HSR image,
  wherein the forward discriminator is trained using a forward adversarial loss function to increase a probability of wrongly determining the first predictive composite HSR image as the input composite HSR image, and
  wherein the backward discriminator is trained using a backward adversarial loss function to increase a probability of wrongly determining the first cycle predictive composite HSR image as the first predictive composite HSR image.

5. The regional precipitation nowcasting system of claim 4, wherein the second cycle-GAN is trained using a second cycle-consistency loss function and the second cycle predictive composite HSR image matches the complementary first predictive composite HSR image,
  wherein the forward discriminator is trained using the forward adversarial loss function to increase a probability of wrongly determining the second cycle predictive composite HSR image as the complementary input composite HSR image, and
  wherein the backward discriminator is trained using the backward adversarial loss function to increase a probability of wrongly determining the complementary first predictive composite HSR image.

6. The regional precipitation nowcasting system of claim 5, wherein the cycle-GAN generates, as the resultant composite HSR image, the first predictive composite HSR image, the complementary first predictive composite HSR image, or the second cycle predictive composite HSR image when the first pixel loss function and the second pixel loss function converge on a predetermined reference pixel loss function value and the first cycle-consistency loss function and the second cycle-consistency loss function converge on a predetermined cycle-consistency loss function value.

7. The regional precipitation nowcasting system of claim 2, wherein each of the forward generator and the backward generator comprises:
  an encoder configured to reduce a size of the input composite HSR image and extract a plurality of feature maps from the input composite HSR image;
  a plurality of squeeze-and-excitation (SE)-residual blocks configured to recalibrate the plurality of feature maps; and
  a decoder configured to restore the size of the input composite HSR image reduced by the encoder.

8. The regional precipitation nowcasting system of claim 7, wherein the forward discriminator and the backward discriminator use a patch-GAN architecture that discriminates in units of patches.

9. A regional precipitation nowcasting method based on cycle-generative adversarial network (GAN) extension, the method comprising:
  receiving an input composite hybrid surface rainfall (HSR) image including precipitation information of a region of interest corresponding to a first time;
  generating, by a cycle-GAN, a resultant composite HSR image including precipitation information of the region of interest corresponding to a second time which is later than the first time, based on the input composite HSR image,
    wherein the cycle-GAN comprises a first cycle-GAN and a second cycle-GAN which is complementary to the first cycle-GAN, and
    wherein the first cycle-GAN and the second cycle-GAN are configured to perform forward image mapping, which temporally goes forward, and backward image mapping, which temporally goes backward, respectively; and
  outputting the resultant composite HSR image as a nowcasting image of the region of interest.

10. The regional precipitation nowcasting method of claim 9, wherein the first cycle-GAN is configured to perform:
  learning predictive mapping of a first predictive composite HSR image of the second time based on the input composite HSR image of the first time using a forward generator;
  learning predictive mapping of a first cycle predictive composite HSR image of the first time based on the first predictive composite HSR image of the first time based on the first predictive composite HSR image of the second time using a backward generator;
  evaluating an accuracy of the predictive mapping of the forward generator and discriminating between the input composite HSR image and the first predictive composite HSR image using a forward discriminator; and
  evaluating an accuracy of the predictive mapping of the backward generator and discriminating between the first predictive composite HSR image and the first cycle predictive composite HSR image using a backward discriminator.

11. The regional precipitation nowcasting method of claim 10, wherein the second cycle-GAN is configured to:
  learn predictive mapping of a complementary input composite HSR image corresponding to the input composite HSR image of the first time based on a complementary first predictive composite HSR image obtained by applying a first pixel loss function to the first predictive composite HSR image of the second time using the backward generator, wherein the complementary input composite HSR image obtained by applying a second pixel loss function to the input composite HSR image has a complementary relationship with the input composite HSR image;

learn predictive mapping of a second cycle predictive composite HSR image of the second time based on the complementary input composite HSR image of the first time using the forward generator;

evaluate an accuracy of predictive mapping of the forward generator and discriminate between the complementary input composite HSR image and the second cycle predictive composite HSR image using the forward discriminator; and evaluate an accuracy of predictive mapping of the backward generator and discriminate between the complementary first predictive composite HSR image and the complementary input composite HSR image using the backward discriminator.

12. The regional precipitation nowcasting method of claim 11, wherein the first cycle-GAN is trained using a first cycle-consistency loss function and the first cycle predictive composite HSR image matches the input composite HSR image, wherein the forward discriminator is trained using a forward adversarial loss function to increase a probability of wrongly determining the first predictive composite HSR image as the input composite HSR image, and wherein the backward discriminator is trained using a backward adversarial loss function to increase a probability of wrongly determining the first cycle predictive composite HSR image as the first predictive composite HSR image.

13. The regional precipitation nowcasting method of claim 12, wherein the second cycle-GAN is trained using a second cycle-consistency loss function and the second cycle predictive composite HSR image matches the complementary first predictive composite HSR image, wherein the forward discriminator is trained using the forward adversarial loss function to increase a probability of wrongly determining the second cycle predictive composite HSR image as the complementary input composite HSR image, and wherein the backward discriminator is trained using the backward adversarial loss function to increase a probability of wrongly determining the complementary input composite HSR image as the complementary first predictive composite HSR image.

14. The regional precipitation nowcasting method of claim 13, wherein the cycle-GAN generates, as the resultant composite HSR image, the first predictive composite HSR image, the complementary first predictive composite HSR image, or the second cycle predictive composite HSR image when the first pixel loss function and the second pixel loss function converge on a predetermined reference pixel loss function value and the first cycle-consistency loss functions and the second cycle-consistency loss function converge on a predetermined cycle-consistency loss function value.

15. The regional precipitation nowcasting method of claim 10, wherein each of the forward generator and the backward generator is configured to perform:

reducing a size of the input composite HSR image and extracting a plurality of feature maps from the input composite HSR image using an encoder;

recalibrating the plurality of feature maps using a plurality of SE-residual blocks; and restoring the size of the input composite HSR image reduced by the encoder using a decoder.

16. The regional precipitation nowcasting method of claim 15, wherein the forward discriminator and the backward discriminator discriminates in units of patches using a patch-GAN architecture.

* * * * *